(12) United States Patent
Yoon et al.

(10) Patent No.: US 12,204,371 B2
(45) Date of Patent: Jan. 21, 2025

(54) JIG FOR INSTALLING SCREEN PROTECTOR TO PORTABLE ELECTRONIC DEVICE

(71) Applicant: SPIGEN KOREA CO., LTD., Seoul (KR)

(72) Inventors: In Sung Yoon, Seoul (KR); Ji Hye Kang, Seoul (KR); Dong Kyung Choi, Seoul (KR)

(73) Assignee: SPIGEN KOREA CO., LTD., Seoul (KR)

( * ) Notice: Subject to any disclaimer, the term of this patent is extended or adjusted under 35 U.S.C. 154(b) by 249 days.

(21) Appl. No.: 17/990,066

(22) Filed: Nov. 18, 2022

(65) Prior Publication Data

US 2023/0412206 A1 Dec. 21, 2023

Related U.S. Application Data

(63) Continuation-in-part of application No. 29/792,306, filed on Mar. 20, 2022, now Pat. No. Des. 1,007,983.

(30) Foreign Application Priority Data

Jun. 17, 2022 (KR) ........................ 10-2022-0074263

(51) Int. Cl.
*G06F 1/16* (2006.01)
*H04B 1/3888* (2015.01)

(52) U.S. Cl.
CPC ......... *G06F 1/1628* (2013.01); *H04B 1/3888* (2013.01)

(58) Field of Classification Search
CPC ........... G06F 1/1628; G06F 2200/1633; G06F 2200/1634; G06F 1/1626; G06F 1/1637; G06F 1/1643; H04B 1/3888
(Continued)

(56) References Cited

U.S. PATENT DOCUMENTS 9,480,319 B2 * 11/2016 Dining ................. H04B 1/3888
9,801,297 B2 * 10/2017 Amin ........................ B32B 7/12
(Continued)

FOREIGN PATENT DOCUMENTS

CN 207292547 U * 5/2018 ............. B65B 33/02
CN 208410748 U * 1/2019
(Continued)

OTHER PUBLICATIONS

Lee Wong Jung, smartphone display protection guide jig, KR 20160098692 A, Aug. 19, 2016, All pages. (Year: 2016).*
(Continued)

*Primary Examiner* — Mahendra R Patel
(74) *Attorney, Agent, or Firm* — Heedong Chae; Lucem, PC

(57) ABSTRACT

The present invention includes a jig for installing a protection member to a portable electronic device and a guide jig device including the same. The jig includes a main body and retaining members formed to be elastically deformed and coupled or connected to the main body while surrounding a mounting space in which the portable electronic device formed in the main body is inserted. The guide jig device is advantageous in that it can be used for a portable electronic device that is manufactured and sold in a size relatively greater than the size of the portable electronic device disclosed before its release.

11 Claims, 6 Drawing Sheets

(58) Field of Classification Search
USPC .................................................. 455/575.8
See application file for complete search history.

(56) References Cited

U.S. PATENT DOCUMENTS

| | | | | |
|---|---|---|---|---|
| 10,564,749 | B2* | 2/2020 | Cheng | H04M 1/0266 |
| 10,839,194 | B2* | 11/2020 | Jung | G06V 40/1329 |
| 10,855,324 | B1* | 12/2020 | Liu | H04M 1/0202 |
| 11,747,632 | B1* | 9/2023 | Shah | G02B 27/0101 |
| | | | | 345/8 |
| 11,817,025 | B1* | 11/2023 | Wang | G09G 3/03 |
| 12,064,939 | B2* | 8/2024 | Ouyang | B32B 27/08 |
| 2014/0333831 | A1* | 11/2014 | Oh | H04M 1/185 |
| | | | | 348/376 |
| 2016/0056852 | A1* | 2/2016 | Shin | H04B 1/3816 |
| | | | | 455/558 |
| 2020/0275560 | A1* | 8/2020 | Zeng | G01P 13/00 |
| 2022/0117367 | A1* | 4/2022 | Poon | A45C 11/00 |

FOREIGN PATENT DOCUMENTS

| | | | | | |
|---|---|---|---|---|---|
| CN | 113263719 | A | * | 8/2021 | ......... B29C 63/0004 |
| CN | 115134445 | A | * | 9/2022 | |
| GB | 2578414 | A | * | 5/2020 | ......... B29C 63/0004 |
| KR | 2016098692 | A | * | 8/2016 | ............ B65H 37/04 |
| KR | 101687343 | B1 | | 12/2016 | |
| WO | WO-2017135781 | A1 | * | 8/2017 | ............ H01R 12/57 |

OTHER PUBLICATIONS

"Spigen Tempered Glass Screen Protector [GlasTR EZ FIT] designed for Nintendo Switch (OLED model)—2 Pack", "https://www.amazon.com/Spigen-Protector-Nintendo-OLED-model/dp/B09FP26WHX/ref=sr_1_3?keywords=spigen+nintento+switch+oled+scre%E2%80%A6", Date First Available on Nov. 19, 2021, Spigen Korea Co., Ltd.

* cited by examiner

JIG FOR INSTALLING SCREEN PROTECTOR TO PORTABLE ELECTRONIC DEVICE

FIELD OF THE INVENTION

The present invention relates to a jig and a guide jig device, and more particularly, to a jig for installing a screen protector to a portable electronic device and a guide jig device including the same.

BACKGROUND OF THE INVENTION

Unless otherwise indicated herein, the contents described in this section are not prior art to the claims of this application, and the description in this section is not admitted as prior art.

Generally, a portable electronic device including a smartphone has a touch-controlled display which provides multimedia images to the user and provides a user interface screen capable of various tasks.

As touch-controlled displays and foldable displays have recently become popular, the display size has increased. In addition, since scratches or handprints on the display cause inconvenience in using the portable electronic device, a protective member such as a protective film or tempered glass is used to protect the display.

However, high level of installing know-how and technique are necessary to attach the protective member to the display without foreign substances present between the protective member and the display, and thus, guide jig devices to precisely orient the protective member right on the display are being researched and developed.

In addition, when a new size of a portable electronic device is released, a jig is manufactured in advance based on the size of the portable electronic device leaked or disclosed before the release. In this case, if the size of the portable electronic device after the release is different from the size of the leaked portable electronic device, there is a disadvantage that it is impossible to use the premade jig.

In this regard, Korean Patent Registration No. 10-1687343 discloses a guide jig for a protective film for a smartphone display, and Korean Patent Registration No. 10-2364704 discloses a sliding guide frame for a smartphone that retains the smartphone and at the same time guides a protective member to be aligned with the smartphone and attached thereto.

However, conventional inventions do not disclose a jig technology for guiding a protective member to the correct position of the display while overcoming a slight error between the size of the portable electronic device leaked or published before the release and the size of the portable electronic device disclosed after the release.

PRIOR ART LITERATURE

Patent Literature (Patent Document 0001) Korean Patent Registration No.
(Patent Document 0002) Korean Patent Registration No. 10-2364704

SUMMARY OF THE INVENTION

Technical Problems

The present invention provides a jig for installing a protection member or a protective film to a portable electronic device and a guide jig device including the same where the jig retains the portable electronic device by using elastically deformable retaining members, which protrude from the bottom of the jig, and guides the protection member, which is attached to the bottom of the jig, to the correct position of the display. In addition, it is not limited to the technical problems as described above, and it is obvious that other technical problems may be derived from the description below.

Solution to Problems

According to an embodiment of the disclosure, the jig includes a main body and a plurality of retaining members where the retaining members are elastically deformable and the plurality of retaining members are coupled or connected to the main body, and to surround a mounting space formed on the main body, and the portable electronic device is inserted into the mounting space.

In addition, contact surfaces of the retaining members are configured to be in close contact with outer side surface of the portable electronic device, and each of the contact surfaces of the retaining members is arranged along a first path extending along the outer side surface of the portable electronic device or a second path shorter than the first path.

In addition, the retaining members include one end, which extends from the main body, and the other end, which is bent from the one end and extends toward the main body, so that the retaining members are configured to be in close contact with the portable electronic device.

In addition, the jig may further comprise a reinforcing member which is constructed to connect the one end of the retaining members and the main body.

In addition, the retaining members comprise a support portion which extends from the main body and is formed in a plate, a deforming portion which is bent from the support portion and extends toward the portable electronic device and the main body, and a contact portion which is bent from the deforming portion and slantly extends toward the main body.

In addition, contact surfaces of the retaining members are configured to be in close contact with outer side surface of the portable electronic device, and each of the contact surfaces of the retaining members is arranged along a first path extending along the outer side surface of the portable electronic device, which is disclosed before its release or sales, or a second path shorter than the first path.

According to another embodiment of the disclosure, a guide jig device includes a jig and a protection member such as a screen protector. The jig includes a main body having a through hole and a plurality of retaining members. The retaining members are elastically deformable and the plurality of retaining members are coupled or connected to the main body, and the plurality of retaining members surround a mounting space formed on a bottom of the main body such that the portable electronic device is inserted into the mounting space. The protection member is disposed on an inner surface of the plurality of retaining members and on a bottom of the jig.

In addition, the retaining members include one end, which extends from the main body, and the other end, which is bent from the one end and extends toward the main body, so that the retaining members are configured to be in close contact with the portable electronic device.

In addition, the guide jig device may further include a removable member which is attached to a top of the jig, where a part of the removable member is removably attached to the protection member through the through hole.

Advantageous Effects of the Invention

The present invention provides a guide jig device for conveniently installing a cover film to a portable electronic device, and since a plurality of retaining members, configured to be elastically deformable, are formed to protrude from the bottom of the jig, it has the advantage that the guide jig device can be used even for a portable electronic device manufactured and sold relatively larger or smaller in size than that leaked before the release.

In addition, the retaining members of the present invention have one end, which is supported by the support portion, and the other end, which is formed in a hook shape that is deformed through the deforming portion and the contact portion, such that the retaining members effectively guides the protection member into the correct position of the display and prevents the portable electronic device from being displaced to a certain side because the retaining members push the front, rear, left, and right outer surfaces of the portable electronic device with a uniform pressure.

In addition, the present invention provides an advantage that the jig of the present invention can guide the protection member to the correct position of the display even when the outer surface of the portable electronic device, which is in close contact with each of the plurality of elastically deformable retaining members, becomes smaller or larger in size when it is released or on sale, compared to the outer surface of the portable electronic device disclosed before its release or sales.

In addition, since the effects of the present invention described above are naturally exhibited by the configuration of the described contents regardless of whether the inventor recognizes them or not, the above-described effects are only a few effects according to the described contents, and it should not be assumed that all effects recognized by the inventor or present are described herein.

In addition, the effect of the present invention should be further understood by the overall description of the specification, and even if it is not described in an explicit sentence, if a person of ordinary skill in the relevant art appreciates such an effect from the specification, it should be considered as the effect described in the present specification.

BRIEF DESCRIPTION OF THE DRAWINGS

These and other features, aspects and advantages of the present invention will become better understood with reference to the accompanying drawings, wherein.

DETAILED DESCRIPTION OF EMBODIMENTS OF THE INVENTION

Figure 1:
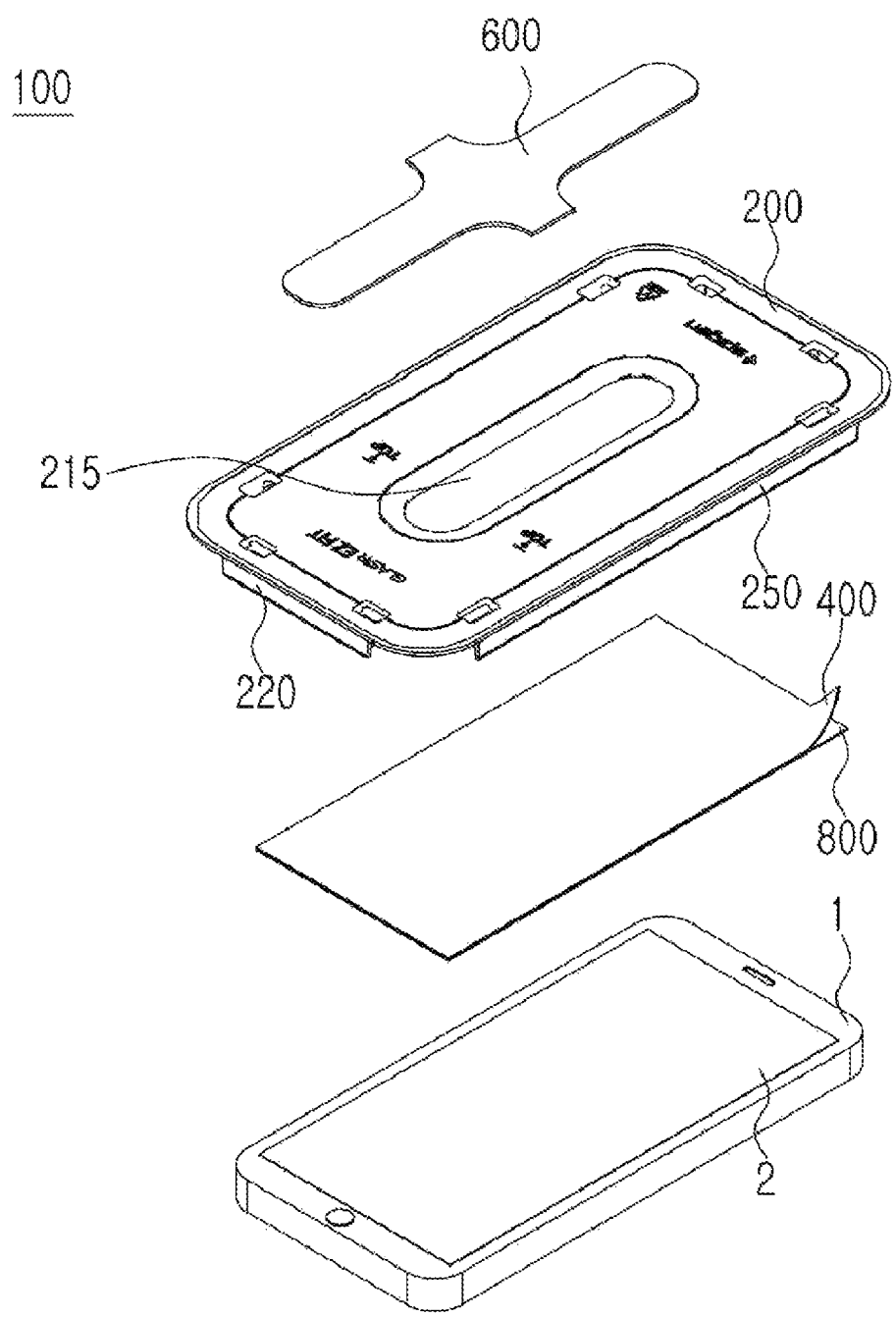
FIG. 1 shows an exploded view of a guide jig device in use according to an embodiment of the present invention.

Hereinafter, with reference to the accompanying drawings, a configuration, operation, and effect of a jig for attaching a terminal protection member and a guide jig device including the jig according to a preferred embodiment will be described. For reference, in the following drawings, certain components may be omitted or schematically illustrated for convenience and clarity, and the size of each component does not reflect the actual size. In addition, the same reference numerals refer to the same components throughout the specification, and reference numerals for the same components in each drawing will be omitted.

As shown in FIG. 1 to FIG. 5, a guide jig device (100) includes a jig (200), a protection member (400), a removable member (600), and a cover film (800).

The guide jig device (100) is a device used to install the protection member (400) to a display (2) of a portable electronic device (1) such as a smartphone, by placing the jig (200) on the upper part of the portable electronic device (1) having the display (2), and lowering the jig (200) to the mounting space (10) formed under the jig (200). There is an advantage that the protection member (400) can be conveniently installed to the display (2) simply by inserting the portable electronic device (1) into the mounting space (10).

Figure 2:
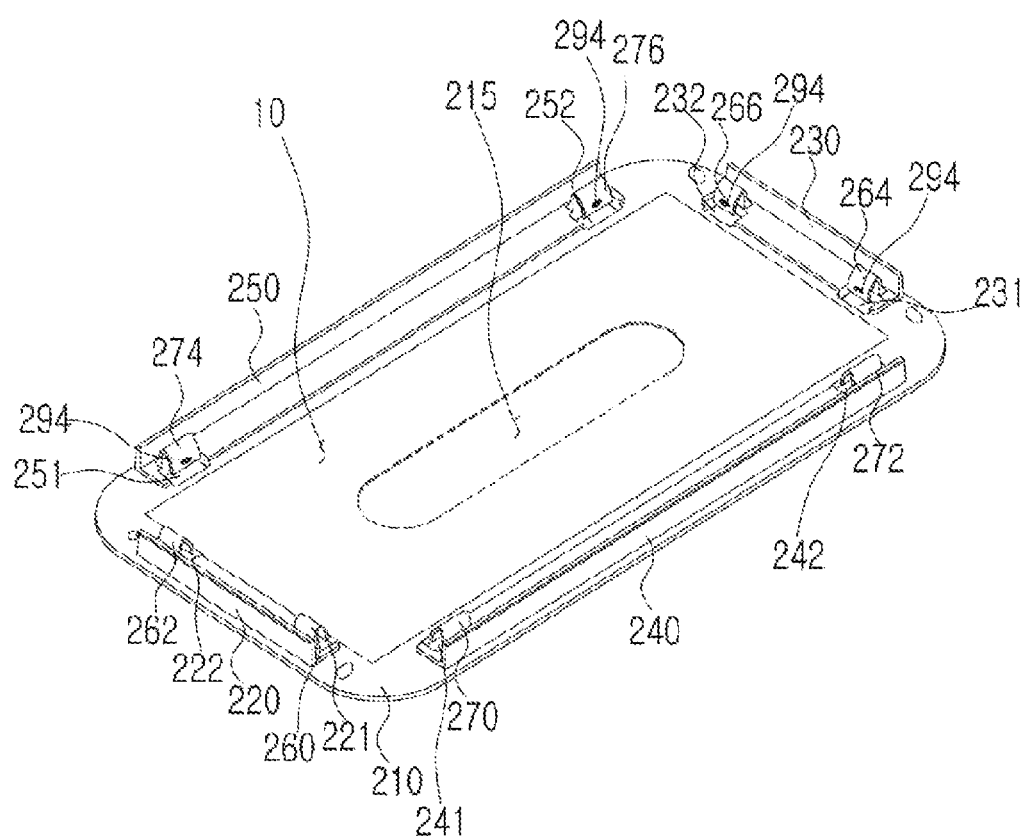
FIG. 2 shows a bottom perspective view of the jig shown in FIG. 1, which is shown from another angle.
Figure 3:
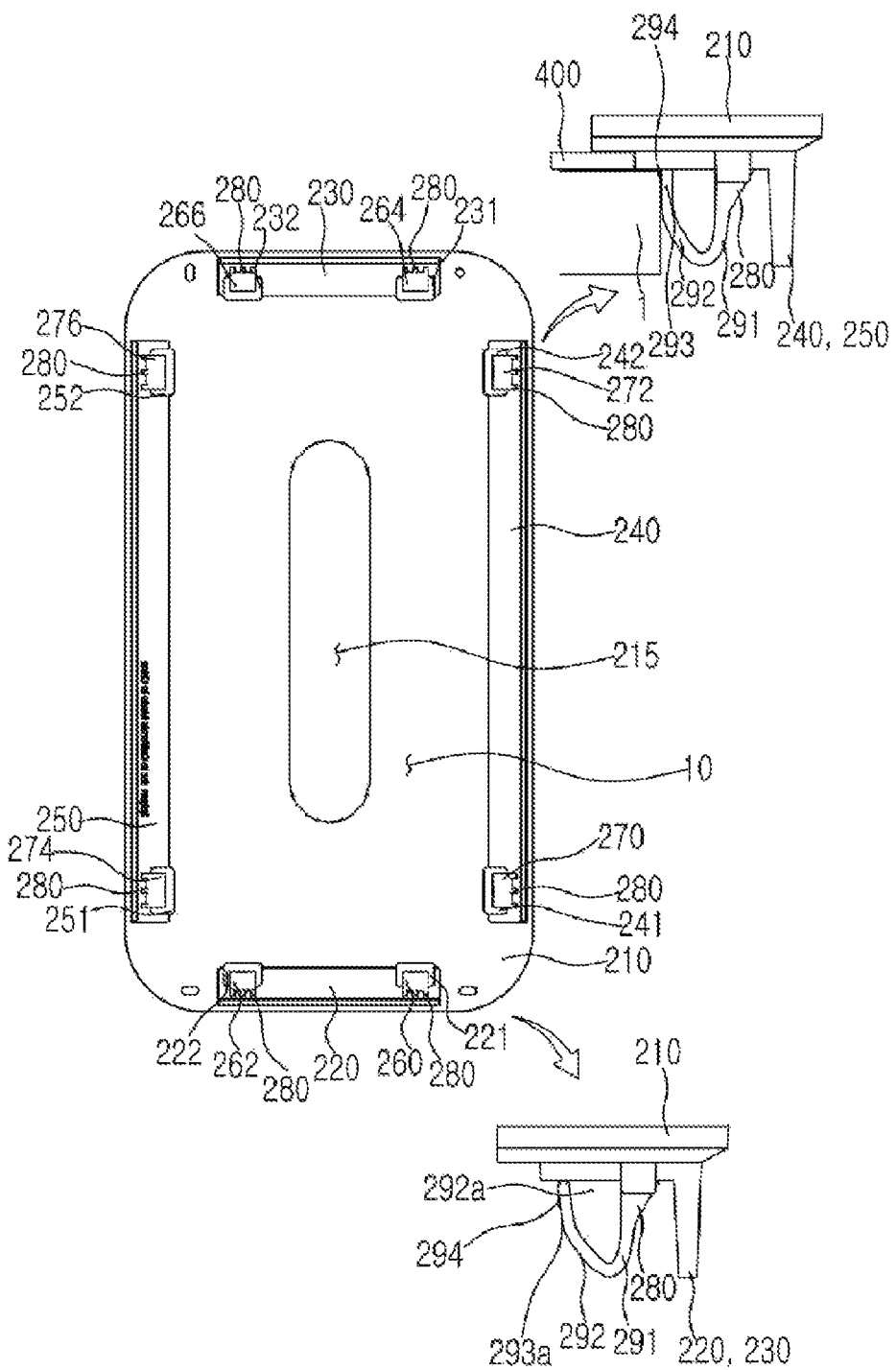
FIG. 3 shows a bottom view of the jig shown in FIG. 1.
Figure 4:
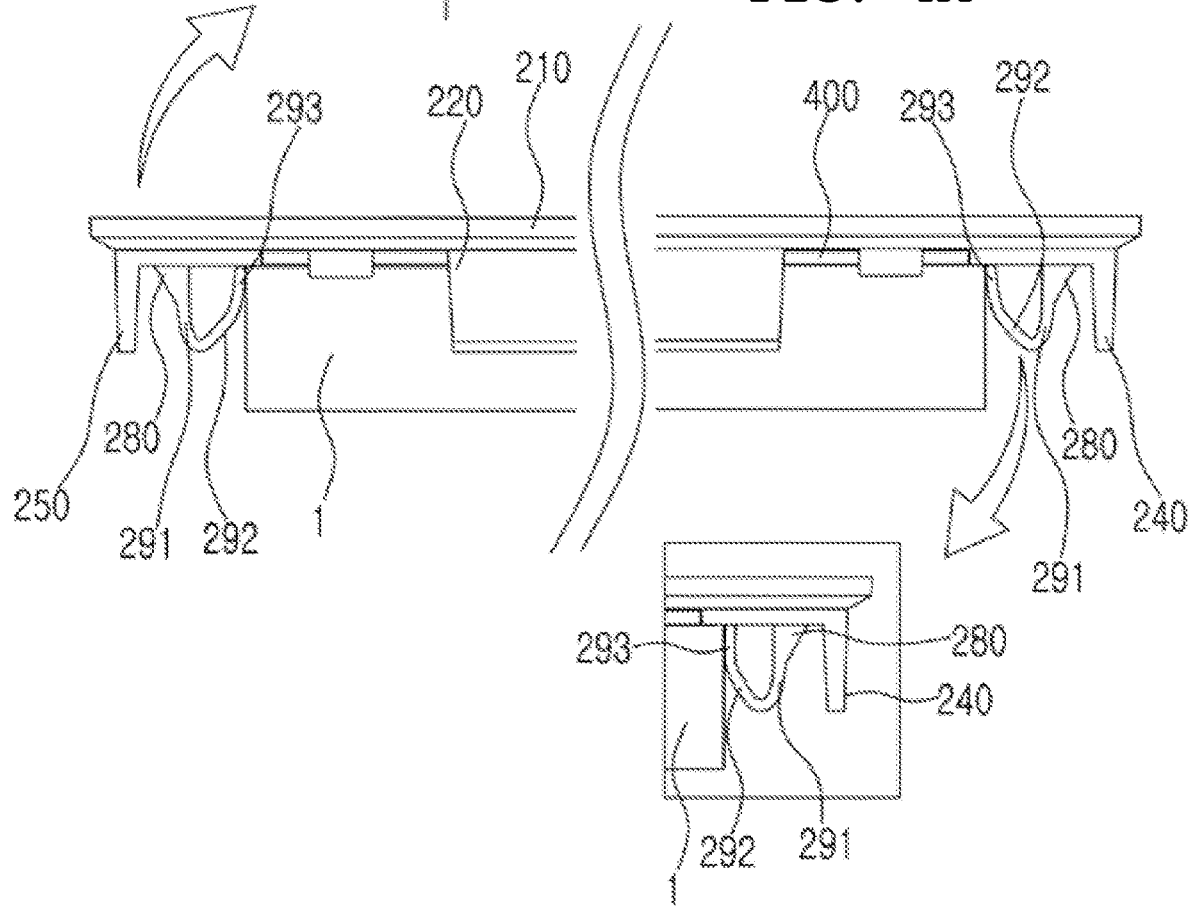
FIGS. 4A, 4B and 4C show a rear view, a partial view, and another partial view of the guide jig device shown in FIG. 1, which is coupled to a portable electronic device.

Specifically, as shown in FIGS. 2 and 3, the jig (200) includes a main body (210), first cover members (220, 230), second cover members (240, 250), first retaining members (260, 262, 264, 266), second retaining members (270, 272, 274, 276), reinforcing members (280), first ribs (310), and second ribs (320).

The jig (200) is formed in a plate shape, and a through hole (215) is formed at the center thereof. The first cover members (220, 230), the second cover members (240, 250), the first retaining members (260, 262, 264, 266), and the second retaining members (270, 272, 274, 276) are formed about at the boundary of the bottom edge of the jig (200). The mounting space (10), into which the portable electronic device is inserted, is formed within the first cover members (220, 230), the second cover member (240, 250), the first retaining members (260, 262, 264, 266), and the second retaining members (270, 272, 274, 276).

The jig 200 may only include the first retaining members (260, 262, 264, 266), the second retaining members (270, 272, 274, 276), and the main body (210) without both of the first cover members (220, 230) and the second cover members (240, 250). In this case, one end of the first retaining member (260), namely, an upper end which may be different from the drawings, is connected to the main body (210), which is exposed at the first hole (221), and the other end of the first retaining member (260) is bent from the one end and is manufactured to extend by a predetermined distance toward the main body (210) and the hole (221).

In addition, the jig (200) may include the first retaining members (260, 262, 264, 266), the second retaining members (270, 272, 274, 276), and the main body 210 without the first cover members (220, 230) and without the second cover members (240, 250). In this case, the central bottom surface of the main body (210) may be formed with a rectangular groove to receive the protection member (400) such as a protective film, glass or the like.

The main body (210) is formed in a rectangular plate shape where the corner-side edge of the main body (210) is tapered, and a part of the central upper surface, which is laterally extended, is depressed toward the bottom to form a through hole (215) which connects the lower portion and upper space of the main body (210).

The bottom and top surfaces of the main body (210) are formed to have an area relatively greater than that of the top surface of the portable electronic device (1) on which the display (2) of the portable electronic device (1) is formed.

The main body (210) is made of polymer, ceramic, or metal, and it is preferably made of a transparent polymer material for the visibility of the display (2) disposed therebelow.

One end of the first cover member (220) is formed in a plate shape longitudinally extending toward one side or the other side such that its upper surface is surface-coupled to the rear bottom surface of the main body (210), and the other end is bent and extended downwardly and vertically from a part of the rear edge of the one end.

The first hole (221) is formed such that a portion of the bottom surface of a side of the one end of the first cover member (220) and a portion of the main body (210) on the same vertical line are depressed to connect the upper space of the main body (210) and the lower space of the one end of the first cover member (220).

The first hole (222) is formed such that a portion of the bottom surface of the other side of the one end of the first cover member (220) and a portion of the main body (210) on the same vertical line are depressed together to connect the upper space of the main body (210) and the lower space of the one end of the first cover member (220).

Each of the first retaining members (260, 262, 264, 266) and the second retaining members (270, 272, 274, 276) is formed in the same shape except the differences in positions and directions, and each includes a support portion (291), a deforming portion (292), a contact portion (293), and a protrusion (294), respectively.

Contact surfaces (293a) of the contact portions (293) formed on each of the first retaining members (260, 262, 264, 266) and the second retaining members (270, 272, 274, 276) are in close contact with the outer surface of the portable electronic device (1) inserted into the mounting space (10).

When the portable electronic device (1) is inserted into the mounting space (10), the position of the protection member (400) is adjusted by the first retaining members (260, 262, 264, 266) and the second retaining members (270, 272, 274, 276) to be disposed on the same vertical line as the display, and when the jig (200) is further lowered, the protective member (400) is attached to the correct position of the display (2) while the outer surfaces of the display (2) and the protection member (400) are positioned on the same vertical line.

Before the portable electronic device (1) is inserted into the mounting space (10), a cover film (800) attached to an adhesive surface of the protection member (400) is separated from the protection member (400), and when the portable electronic device (1) is inserted into the mounting space (10), the adhesive surface exposed under the protective member (400) is attached to the display (2).

Since the guide jig device (100) has to be manufactured in advance before the portable electronic device (1) is sold on the market, the first retaining members (260, 262, 264, 266) and the second retaining members (270, 272, 274, 276) are manufactured to be disposed according to the size of the portable electronic device (1) that has been disclosed or leaked on the market, and the contact surfaces (293a) are disposed along the outer side path which is the same in same as the outer side path of the portable electronic device (1) disclosed before its sales, or the outer side path which is relatively smaller in size than the outer side path of the portable electronic device (1) disclosed before its sales.

Specifically, one end of the first retaining member (260) is formed in a vertical plate shape extending upwardly and downwardly and connected to the lower surface of the one side of the one end of the first cover member (220), and the other end of the first retaining member (260) is bent at the one end and extends by a predetermined distance toward the main body (210) or the first hole (221).

A contact surface (293a), which corresponds to the front of the contact portion (293) formed at the other end of the first retaining member (260), is in close contact with the rear surface of the portable electronic device (1) inserted into the mounting space (10), and depending on the error in size of the portable electronic device (1) sold, the contact portion (293) may be in close contact with the outer side surface of the portable electronic device (1) while being elastically moved toward the other end of the first cover member (220).

One end of the support portion (291) downwardly extends from one end of the first cover member (220) in the form of a vertical plate, and reinforcing members (280) connecting the support portion (291) and the one end of the first cover member (220) are formed between the support portion (291) and the other end of the first cover member (220).

Each of the plurality of reinforcing members (280) is formed in the form of a triangular plate, and connects the one end of the support portion (291) to the first cover member (220) such that they are disposed to be spaced apart by the same distance from one side to the other side.

Figure 5:
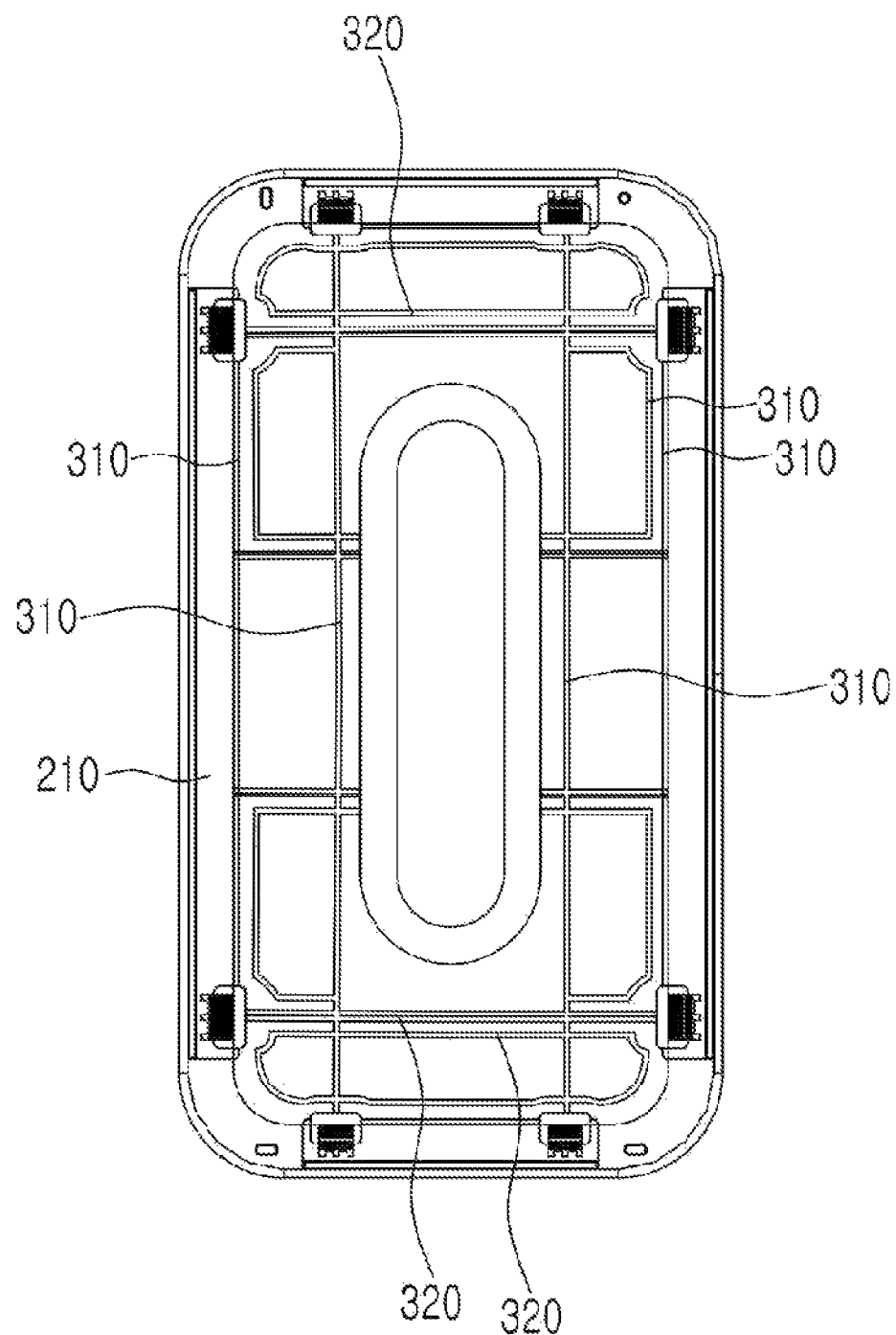
FIG. 5 shows a plan view of the guide jig device of FIG. 1.

As shown in FIG. 5, first ribs (310) are formed by upwardly protruding by a predetermined distance from a part of the upper surface of the stick-shaped jig (200) where the first ribs (310) are longitudinally extended in the forward and backward directions and spaced apart from each other on both sides.

Second ribs (320) are formed by upwardly protruding by a predetermined distance from a part of the upper surface of the stick-shaped jig (200) where the second ribs (320) are longitudinally extended in the one end and the other end directions and spaced apart from each other in the forward and backward directions.

The first and second ribs (310, 320) prevent the occurrence of the incident that when the guide jig device (200) and the portable electronic device (1) are coupled to each other, the jig (200) is bent and a portion of the protective member (400) is attached to the display (2) of the portable electronic device (1).

In other words, the outer side surfaces of the portable electronic device (1) are inserted into the mounting space (10) inside of the first retaining members (260, 262, 264, 266) and the second retaining members (270, 272, 274, 276), and the contact portions (293) of the first retaining members (260, 262, 264, 266) and the second retaining members (270, 272, 274, 276) are deformed. As a result, the user's force required to lower the jig (200) is relatively increased, and thus, if the jig (200) without the first and second ribs (310, 320) is deformed, there is a disadvantage that the attachment position of the protective member (400) is changed as a part of protective member (400) is first attached to the display (2).

Accordingly, the first and second ribs (310, 320) guide the protective member (400) to be attached to the correct position of the display (2) by preventing the jig (200) from being deformed when the jig (200) and the portable electronic device (1) are coupled to each other.

As shown in FIGS. 3, 4A, 4B, and 4C, a deforming portion (292) is bent from the lower part of the support portion (291) toward the upper part, and obliquely extends by a predetermined distance toward the mounting space (10) and the main body (210) while maintaining to be spaced apart between the support portion (291) and a deformation space (292a).

The contact portion (293) extends by a predetermined distance toward the mounting space (10) and the main body (210) such that it is bent by a predetermined angle toward the support portion (291) or toward the direction relatively outward than the extension direction of the deforming portion (292).

The protrusion (294) is formed by convexly protruding a portion of the contact surface (293a) toward the portable electronic device (1) by a predetermined distance where the oval contact surface (293a) extends in a direction parallel to the outer side surface of the portable electronic device (1) in close contact with the contact surface (293a).

When the portable electronic device (1) is inserted into the mounting space (10) and the outer side surface of the portable electronic device (1) is in close contact with the contact portion (293), the adhesive surface of the protective member (400) disposed in the mounting space (10) is attached to the display (2) of the portable electronic device (1).

When the size of the portable electronic device (1) to be inserted into the mounting space (10) is relatively larger than the size of the portable electronic device (1) disclosed or leaked before its sales, the contact portion (293) is pushed by a predetermined distance into the deformation space (292a) by the outer side surface of the portable electronic device (1), and the deforming portion (292) is deformed and moved toward the support portion (291).

Since the elastic force of the deforming portion (292) formed in the first retaining members (260, 262, 264, 266) and the second retaining members (270, 272, 274, 276) is the same, even if the size of the portable electronic device (1) on sale is larger than the size of the portable electronic device (1) disclosed before its sales, the protective member (400) is attached to the correct position of the display (2) when the portable electronic device (1) is inserted into the mounting space (10).

For example, in case when the size of both sides of the portable electronic device (1) on sale inserted into the mounting space (10) is manufactured relatively longer in one side or the other side direction than the size of the portable electronic device (1) disclosed before its sales, when the portable electronic device (1) is inserted into the mounting space (10), the portable electronic device (1) is prevented from being displaced to the one side or the other side direction because the contact portions (293) formed in the second retaining members (270, 272) are moved toward the deformation space (292a) by the same distance as the contact portions (293) formed in the second retaining members (274, 276).

In addition, in case when the size of the front and rear sides of the portable electronic device (1) on sale inserted into the mounting space (10) is manufactured relatively longer in the front and rear direction than the size of the portable electronic device (1) disclosed before its sales, when the portable electronic device (1) is inserted into the mounting space (10), the portable electronic device (1) is prevented from being displaced to the front or rear direction because the contact portions (293) formed in the first retaining members (260, 262) are moved toward the deformation space (292a) by the same distance as the contact portions (293) formed in the first retaining members (264, 266).

While the contact portions (293) are moved toward the deformation space (292a), the position of the support portion (291) is maintained by the reinforcing members (280), and the position of the portable electronic device (1) is stably maintained without being displaced to a certain direction by the elastic restoring force of the deforming position (292) and the supporting force of the support portion (291).

Referring to FIG. 4A, when the size of the portable electronic device (1) after its release or sales is smaller than the size of portable electronic device (1) disclosed before its release or sales, a portion of the upper part of the contact portion (293) and the protrusion (294) are in close contact with the portable electronic device (1).

Referring to FIG. 4B, when the size of the portable electronic device (1) after its release or sales is the same as the size of the portable electronic device (1) disclosed before its release or sales, the contact surface (293a) of the contact portion (293) and the protrusion (294) are in close contact with the portable electronic device (1) to fix the position of portable electronic device (1).

Referring to FIG. 4C, when the size of the portable electronic device (1) after its release or sales is relatively larger than the size of the portable electronic device (1) disclosed before its release or sales, a portion of the upper part of the contact portion (293) is spaced apart from the portable electronic device (1) whereas a portion of the deforming portion (292), a portion of the lower portion of the contact portion (293), and the protrusion (294) are in close contact with the portable electronic device (1).

Therefore, the guide jig device (100) has the advantage of guiding the protection member (400) to be attached to the correct position of the display (2) while being coupled to the portable electronic device (1) even when the size of the portable electronic device (1) after its release or sales is different from the expected size as long as the difference is within a certain range.

Specifically, one end of the first retaining member (262) is formed in a vertical plate shape extending upwardly and downwardly and connected to the bottom surface of the other side of the one end of the first cover member (220). The other end of the first retaining member (262) is bent from the one end toward the front and the upper side and extends towards the main body (210) or the first hole (222).

The contact surface (293a) formed at the other end of the first retaining member (262) is in close contact with the rear surface of the portable electronic device (1) inserted into the mounting space (10), and depending on the error in size of the portable electronic device (1) sold, the contact surface (293a) may be in close contact with the rear surface of the portable electronic device (1) while being elastically moved toward the deformation space (292a).

One end of the first cover member (230) is formed in a plate shape longitudinally extending toward one side or the other side such that the upper surface of the first cover member (230) is surface-coupled or integrally connected to the front-side bottom surface of the main body (210). The other end of the first cover member (230) is formed by bending a portion of the rear edge of the one end of the first cover member (230) and extending it downwardly and vertically.

The first hole (231) is formed such that a portion of the bottom surface of a side of the one end of the first cover member (230) and a portion of the main body (210) on the same vertical line are depressed to connect the upper space of the main body (210) and the lower space of the one end of the first cover member (230).

The first hole (231) may be formed by depressing a portion of the main body (210) if the first cover member (230) is not present, or the first hole (231) may not be formed depending on the structure of the portable electronic device (1) or the manufacturing environment of the jig (200).

The first hole (232) is formed such that a portion of the bottom surface of a side of the other end of the first cover member (230) and a portion of the main body (210) on the same vertical line are depressed together to connect the upper space of the main body (210) and the lower space of one of the first cover member (230).

One end of the first retaining member (264) is formed in a vertical plate shape extending upwardly and downwardly and connected to the bottom surface of a side of one end of the first cover member (230), and the other end is bent from the one end toward the rear and the upper side and extends towards the main body (210) or the first hole (231) by a predetermined distance.

The contact surface (293a) formed at the other end of the first retaining member (264) is in close contact with the front surface of the portable electronic device (1) inserted into the mounting space (10), and depending on the error in size of the portable electronic device (1) sold, the contact portion (293) may be in close contact with the outer front surface of the portable electronic device (1) while being elastically moved toward the deformation space (292a).

One end of the first retaining member (266) is formed in a vertical plate shape extending upwardly and downwardly and connected to the bottom surface of the other side direction of the one end of the first cover member (230), and the other end is bent from the one end toward the rear and the upper side and extends towards the main body (210) or the first hole (232) by a predetermined distance.

The contact surface (293a) formed at the other end of the first retaining member (266) is in close contact with the front surface of the portable electronic device (1) inserted into the mounting space (10), and depending on the error in size of the portable electronic device (1) sold, the contact portion (293) may be in close contact with the front surface of the portable electronic device (1) while being elastically moved toward the deformation space (292a).

One end of the second cover member (240) is formed in a plate shape longitudinally extending toward the front and rear such that its upper surface is surface-coupled to the bottom surface of the one end of the main body (210), and the other end is formed by bending a portion of the rear edge of the one end of the second cover member (240) and extending it downwardly and vertically.

The second hole (241) is formed such that a portion of the bottom surface of a side of the one end of the second cover member (230) and a portion of the main body (210) on the same vertical line are depressed to connect the upper space of the main body (210) and the lower space of one end of the second cover member (230).

The second hole (241) may be formed by depressing a portion of the main body (210) if the second cover member (240) is not present, or the second hole (241) may not be formed depending on the structure of the portable electronic device (1) or the manufacturing environment of the jig (200).

The second hole (242) is formed such that a portion of the bottom surface of a front side of one end of the second cover member (240) and a portion of the main body (210) on the same vertical line are depressed together to connect the upper space of the main body (210) and the lower space of one end of the second cover member (240).

One end of the second retaining member (270) is formed in a plate shape extending upwardly and downwardly and connected to the bottom surface of the other side direction of the one end of the second cover member (240), and the other end is bent from the one end toward the other side and the upper side and extends towards the main body (210) or the second hole (241) by a predetermined distance.

The contact surface (293a) formed at the other end of the second retaining member (270) is in close contact with a side of the portable electronic device (1) inserted into the mounting space (10), and depending on the error in size of the portable electronic device (1) sold, the contact portion (293) may be in close contact with the side of the portable electronic device (1) while being elastically moved toward the deformation space (292a).

One end of the second retaining member (272) is formed in a vertical plate shape extending upwardly and downwardly and connected to the bottom surface of a front of one end of the second cover member (240), and the other end is bent from the one end toward the other side and the upper side and extends towards the main body (210) or the second hole (242) by a predetermined distance.

The contact surface (293a) formed at the other end of the second retaining member (272) is in close contact with the front surface of the portable electronic device (1) inserted into the mounting space (10), and depending on the error in size of the portable electronic device (1) sold, the contact portion (293) may be in close contact with a side of the portable electronic device (1) while being elastically moved toward the deformation space (292a).

One end of the second cover member (250) is formed in a plate shape longitudinally extending toward the front and rear such that the upper surface is surface-coupled to the bottom surface of the other end of the main body (210), and the other end is formed by bending a portion of the rear edge of the one end of the second cover member (250) and extending it downwardly and vertically.

The second hole (251) is formed such that a portion of the bottom surface of a side of the one end of the second cover member (240) and a portion of the main body (210) on the same vertical line are depressed to connect the upper space of the main body (210) and the lower space of one end of the second cover member (250).

The second hole (251) may be formed by depressing a portion of the main body (210) if the second cover member (250) is not present, or the second hole (251) may not be formed depending on the structure of the portable electronic device (1) or the manufacturing environment of the jig (200).

The second hole (252) is formed such that a portion of the bottom surface of a front side of one end of the second cover member (250) and a portion of the main body (210) on the same vertical line are depressed together to connect the upper space of the main body (210) and the lower space of one end of the second cover member (250).

One end of the second retaining member (274) is formed in a vertical plate shape extending upwardly and downwardly and connected to the bottom surface of the other side direction of the one end of the second cover member (250), and the other end is bent from the one end toward the other side and the upper side and extends towards the main body (210) or the second hole (251) by a predetermined distance.

The contact surface (293a) formed at the other end of the second retaining member (274) is in close contact with the other side of the portable electronic device (1) inserted into the mounting space (10), and depending on the error in size of the portable electronic device (1) sold, the contact portion (293) may be in close contact with the other side of the portable electronic device (1) while being elastically moved toward the deformation space (292a).

One end of the second retaining member (276) is formed in a vertical plate shape extending upwardly and downwardly and connected to the bottom surface of a front of one end of the second cover member (250), and the other end is bent from the one end toward the side and the upper side and extends towards the main body (210) or the second hole (252) by a predetermined distance.

The contact surface (293*a*) formed at the other end of the second retaining member (276) is in close contact with the other side surface of the portable electronic device (1) inserted into the mounting space (10), and depending on the error in size of the portable electronic device (1) sold, the contact portion (293) may be in close contact with the other side surface of the portable electronic device (1) while being elastically moved toward the deformation space (292*a*).

The lengths between the top and bottom of the other ends of the first cover member (220, 230) and the second cover member (240, 250) may be manufactured to be the same as the length between the top and bottom of the portable electronic device (1) inserted into the mounting space (10) and in close contact with the bottom surfaces of the one ends of the first cover member (220, 230) and the second cover member (240, 250)

In this case, when the jig (200) and the protection member (400) are lowered and the portable electronic device (1) is inserted into the mounting space (10), the tips of the other ends of the first cover member (220, 230) and the second cover member (240, 250) are in close contact with the ground around the portable electronic device (1) and the jig (200) is not inclined to one side. This is advantageous in that the pressure is uniformly applied to the upper surface of the protection member (400) being attached to the surface of the display (2), and the protection member (400) is stably attached to the display (2).

As shown in FIG. 1, the protection member (400) is manufactured in the form of a protective film or tempered glass having the same size of top and bottom surfaces as the display (2) surface area, and a cover film (800) is detachably attached to the bottom surface of the protection member (400).

The protection member (400) is inserted into the mounting space (10) such that the upper surface is in close contact with the lower surface of the main body (210), and a portion of the upper surface of the protection member (400) is detachably attached through a through hole (215) to the lower adhesive surface of a removable member (600) disposed on the upper part of the main body (210).

While the protection member (400) and the cover film (800) are attached to the lower part of the jig (200) by the removable member (600), the cover film (800) is separated. When the jig (200) is lowered toward the portable electronic device (1), the contact surfaces (293*a*) of the first retaining members (260, 262, 264, 266) and the second retaining members (270, 272, 274, 276) become in close contact with the outer side surface of the portable electronic device (1), and the position of the protection member (400) is guided so that the protection member (400) is positioned on the same vertical line as the display (2). When the jig (200) is further lowered, the adhesive surface formed on the bottom surface of the protection member (400) becomes in close contact with the correct position of the display (2).

The outer side surface of the rim of the protection member (400) adhered to the display (2) is connected to the outer side surface of the rim of the display (2), forming a plane perpendicular to the ground. If the protection member (400) is made smaller than the size of the upper surface of the display (2), it covers the inner surface of the upper surface of the display (2).

While the protection member (400) is attached to the display (2), the upper surface of the removable member (600) is pressed with a finger and the finger is moved along the front and rear directions. Then, the lower surface of the protection member (400) is attached to the display (2), and then, the removable member (600) and the jig (200) are separated from the protection member (400) in order to complete the process of attaching the protection member (400) to the display (2).

The removable member (600) is formed in a sticker shape extending in the front and rear directions, and a part of one side and a part of the other side protrude respectively toward the one side and the other side. In addition, an adhesive surface is formed on the bottom surface to be attached to the jig (200) and the protection member (400).

The removable member (600) has an adhesive surface formed on the bottom surface. The front and rear portions are attached to the upper surface of the main body (210) corresponding to the front and rear portions of the through hole (215), and one side and the other side portions are attached to the upper surface of the main body (215) corresponding to one side and the other side of the through hole. The center of the bottom surface of the removable member (600) is attached to the upper surface of the protection member (400) through the through hole (215).

Therefore, the removable member (600) is detachably coupled to the upper surface of the main body (210) and a portion of the upper surface of the protection member (400) at the upper portion of the through hole (215) to connect the main body (210) and the protection member (400).

When the protection member (400) is attached to the display (2) while the portable electronic device (1) is inserted and mounted in the mounting space (10) of the jig (200), the removable member (600) is separated, and the portable electronic device (1) is downwardly pushed through any one of the through hole (215)0, the first hole (221, 222, 231, 232), or the second hole (241, 241, 251, 252) to separate the portable electronic device (1) and the main body (210).

And yet, the numbers of the first retaining members (260, 262, 264, 266) and the second retaining members (270, 272, 274, 276) may be decreased or increased depending on the size of the portable electronic device (1), and when the shape of the portable electronic device (1) is not a rectangle, they are disposed along the outer side surface of the portable electronic device (1).

In addition, as to the first retaining members (260, 262, 264, 266) and the second retaining members (270, 272, 274, 276) formed on the jig (200), a polymer elastic member having an elastic restoring force may be attached to the jig (200) instead of the structure of the first retaining members (260, 262, 264, 266) and the second retaining members (270, 272, 274, 276).

In addition, when the polymer elastic member having elastic restoring force is used instead of the first retaining members (260, 262, 264, 266) and the second retaining members (270, 272, 274, 276) formed on the jig (200), the elastic polymer member may be manufactured in the form of a stick longitudinally extending in one direction, unlike the structure of the first retaining members (260, 262, 264, 266) and the second retaining members (270, 272, 274, 276).

As shown in FIGS. 6A, 6B, 6C, and 6D, the development process from the initial design stage to the final completion stage of the guide jig device (100) is described through the drawings, and the unique structure of the first retaining members (260, 262, 264, 266) and the second retaining members (270, 272, 274, 276) of the guide jig device (100) is explained in that their structure is different from the structure of other general elastic members.

Figure 6A:
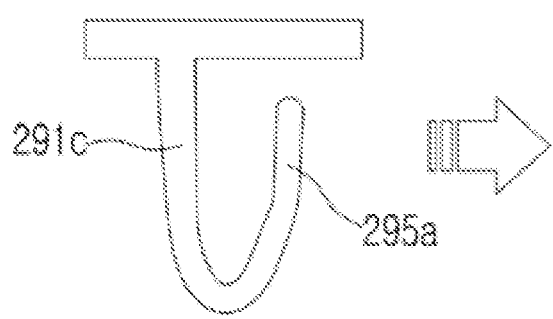
FIGS. 6A, 6B, 6C and 6D show schematic views showing the development stages of the guide jig device of FIG. 1.

As shown in FIG. 6A, in the first stage, the retaining member designed and manufactured in the initial stage has no structure of the reinforcing member (280) or the protrusion (294). The cross-section was manufactured to be similar to the shape of a cross-sectional structure of the first retaining members (260, 262, 264, 266) and the second retaining members (270, 272, 274, 276).

However, the retaining member structure of FIG. 6(a) has the disadvantages that the coupling between the portable electronic device (1) and the guide jig device (100) is unstable because the contact portion (295a) has low flexibility, and the coupling location between the guide jig device (100) and the portable electronic device (10) changes whenever they are coupled to each other because the position of the support portion (291c) is not fixed, in case when the size of the portable electronic device (1) (the distance between the two sides or the distance between the front and rear surfaces) becomes greater than the size disclosed before its release or sales by 1 mm or more.

Figure 6B:
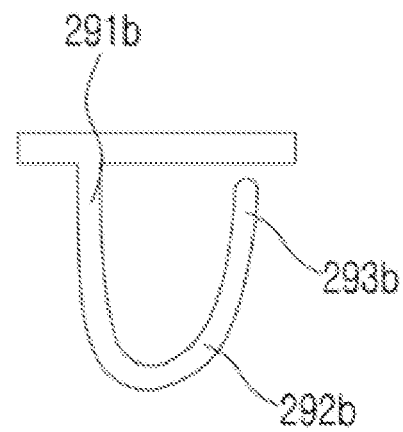

As shown in FIG. 6B, in the second stage of redesigning and manufacturing the guide jig device (100) for its completion, in order to improve the flexibility of the contact portion (295a), which was the disadvantage of the first stage, the thickness of the support portion (291b), the deforming portion (292b), and the contact portion (293b) was made relatively thinner than that of the contact portion (295a), and the distance between the support portion (291b) and the contact portion (293b) was made relatively longer than that of the retaining member in the first stage.

The thicknesses of the support portion (291b), the deforming portion (292b), and the contact portion (293b) of the retaining member manufactured in the second stage was respectively 0.85 mm, and when the guide jig device (100) and the portable electronic device (1) are coupled to each other, the contact portion (293b) was made to elastically move toward the support portion (291b) by about 1.3 mm.

However, while the retaining member manufactured in the second stage has the advantage that the contact portion (293b) is flexibly deformed, coupling the portable electronic device (1) to the guide jig device (100) led to the guide jig device (100) bouncing back up due to the increased elasticity. In addition, the problem that the coupling location between the guide jig device (100) and the portable electronic device (10) changes whenever they are coupled to each other remained.

Figure 6D:
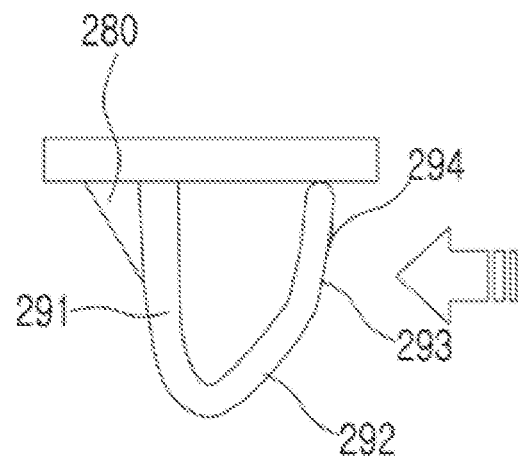
Figure 6C:
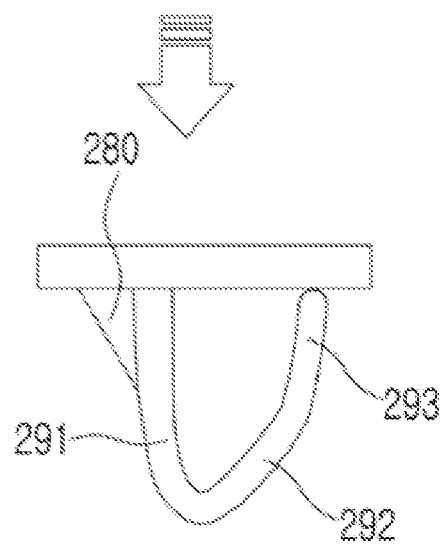

As shown in FIG. 6C, in the third stage of designing and manufacturing the guide jig device (100) for its completion, in order to prevent the bouncing phenomenon of the guide jig device (100), which was the disadvantage of the second stage, the thickness of the support portion (291) was manufactured at 1.13 mm, which is relatively greater than the thickness of the support portion (291b), and the thickness of the deforming part (292) and the contact portion (293) was manufactured at 0.7-0.8 mm, which is relatively smaller than the thickness of the deforming portion (292b) and the contact portion (293b). In addition, and the reinforcing members (280) were added.

As a result, the retaining member manufactured in the third stage has the advantages that whenever the guide jig device (100) and the portable electronic device (10) are coupled to each other, their coupling location remains within the reduced range of error because the position of the support portion (291) is maintained and only the deforming portion (292) is deformed during the coupling of the portable electronic device (1) to the guide jig device (100), and that the positions of the portable electronic device (1) coupled to the guide jig device become consistent.

However, the contact portion (293) that is in close contact with the side of the portable electronic device (1) pushes the portable electronic device (1) by the elastic restoring force of the deforming portion (292) and slides upwardly, and thus, the bouncing phenomenon that the guide jig device (100) bounds back up over the upper part of the portable electronic device (1) has persisted.

And yet, the thickness of the support portion (291) of the retaining member formed on the guide jig device (100) is preferably 1.13 mm. Even when the thickness was manufactured to be between 1.03 mm to 1.23 mm, the coupling location of the portable electronic device (10) remains within the reduced range of error and the position of the portable electronic device (1) coupled to the guide jig device (100) is consistently maintained because the holding force of the support portion (291) is strengthened by the reinforcing member (280).

As shown in FIG. 6D, in the fourth stage, in order to prevent the bouncing phenomenon that the guide jig device (100) coupled to the upper part of the portable electronic device (1) bounces upwardly due to the slippage between the side of the portable electronic device (1) and the contact portion (293), a protrusion (294) was added to the contact portion (293).

By adding the protrusion (294), the friction or holding force between the contact portion (293) and the portable electronic device (1) is increased, and the contact portions (293) are attached to the portable electronic device (1) by the elastic restoring force of the deforming portion (292), stopping the bouncing phenomenon that the contact portions (293) slip on the side of the portable electronic device (1) and the guide jig device (100) bounces upwardly.

Through the design and manufacturing process of the fourth stage, the guide jig device was manufactured in that the thickness of the deforming portion (292) and the contact portion (293) formed in the first retaining members (260, 262, 264, 266) and the second retaining members (270, 272, 274, 276) is manufactured at 0.7 to 0.8 mm, and that the thickness of the support portion (291) was manufactured at 1.13 mm, thereby the range error of the coupling position of the portable electronic device (1), which occurred when the portable electronic device (1) and the guide jig device 100 were coupled to each other, was reduced.

In addition, the protrusion (294) is formed so that a portion of the contact surface (293a), in oval shape longitudinally extending in a direction parallel to the outer side surface of the portable electronic device (1) in close contact with the contact surface (293a), convexly protrudes toward the portable electronic device (1) by a predetermined distance. The thickness of the protrusion (294) was manufactured at around 0.1 mm to facilitate the up-and-down movement of the portable electronic device (1) in close contact with the contact surface (293a), and through this, the bouncing phenomenon of the guide jig device (100), upwardly bouncing during the coupling process of the portable electronic device (1) and the guide jig device (100), has disappeared.

If the thickness of the protrusion (294) is made to be mm or more, the protrusion (294) hinders the downward movement of the guide jig device (100) in the process of coupling the guide jig device (100) and the portable electronic device (1), and thus, the thickness of the protrusion (294) is preferably manufactured to be less than 0.1 mm.

As for the reinforcing member (280), it prevents the deformation of the support portion (291) during the coupling process of the guide jig device (100) and the portable electronic device (1), and thus, while the guide jig device (100) and the portable electronic device (1) are coupled, the position of the guide jig device (100) is stably guided to reach a predetermined position.

In addition, the distance between the contact portions (293) formed on the second retaining members (270, 272) and the contact portions formed on the second retaining members (274, 276) is preferably made to be relatively shorter than the distance between the opposite sides of the portable electronic device (1).

Specifically, the guide jig device (100) is preferably manufactured such that when the portable electronic device (1) manufactured with the same sizes as the numerical values disclosed before its released or sold is coupled to the guide jig device (100), the upper end of the contact portion (293) is elastically moved by 0.5 mm toward the support portion (291).

Since the mock-up of the portable electronic device (1) manufactured according to the numerical values disclosed before its release or sales is manufactured so that the upper end of the contact portion (293) formed on the second retaining members (270, 272, 274, 276) is elastically moved by 0.5 mm toward the support portion (291) while the coupling process of the portable electronic device (1) and the guide jig device (100) are coupled, the guide jig device (100) can be used even if the distance between both sides of the portable electronic device (1) after its released or sold is reduced up to 1 mm.

In addition, it is preferable that the distance between the contact portions (293) formed on the first retaining members (260, 262) and the contact portions (293) formed on the first retaining members (264, 266) is relatively shorter than the distance between the front and rear surfaces of the portable electronic device (1).

Specifically, when the mock-up of the portable electronic device (1) manufactured according to the numerical values disclosed before its released or sold is attached to the guide jig device (100), it is preferable that the upper end of the contact portion (293) of the first retaining members (260, 262, 264, 266) is manufactured to elastically move by 0.5 mm toward the support portion (291).

Since the mock-up of the portable electronic device (1) manufactured according to the numerical values disclosed before its release or sales is manufactured such that the upper end of the contact portion (293) formed on the second retaining members (260, 262, 264, 266) is elastically moved by 0.5 mm toward the support portion (291) while the portable electronic device (1) and the guide jig device (100) are coupled, the guide jig device (100) can be used even if the distance between the front and rear surfaces of the portable electronic device (1) after its released or sold is reduced up to 1 mm.

For reference, the outer side surface of the portable electronic device (1) disclosed in the drawings is described as the front, the back, one side and the other side in order to be consistent with the direction of the guide jig device 100. As for the plan view of the guide jig device (100) shown in FIG. 5, the reinforcing members (280) are visibly described in the plan view given that the jig (200) is made of a transparent material.

The preferred embodiments of the present invention have been described with reference to the accompanying drawings. But, the embodiments described in the present specification and the configurations shown in the drawings are only the most preferred embodiments of the present invention and provide the technical spirit of the present invention, and it should be understood that various equivalents and modifications may be substituted for them at the time of filing the present application. Therefore, the embodiments described above are to be understood as illustrative and not restrictive in all respects, and the scope of the present invention is indicated by the following claims rather than the detailed description, all changes or modifications derived from the meaning and scope of the claims and their equivalents should be construed as being included in the scope of the present invention.

LIST OF REFERENCE CHARACTERS

1: Portable terminal
2: Display
100: Guide jig device
200: Jig
400: Protection member
600: Detachable member
800: Cover film

The invention claimed is:

1. A jig for installing a protection member on a portable electronic device, the jig comprising:
   a main body; and
   a plurality of retaining members configured to be elastically deformable,
   wherein the plurality of retaining members are coupled or connected to the main body,
   wherein the plurality of retaining members surround a mounting space formed on the main body, and the portable electronic device is inserted into the mounting space, and
   wherein a part of a removable member is removably attached to the protection member through a through hole of the main body.

2. The jig of claim 1, wherein contact surfaces of the retaining members are configured to be in close contact with outer side surface of the portable electronic device, wherein each of the contact surfaces of the retaining members is arranged along a first path extending along the outer side surface of the portable electronic device or a second path shorter than the first path.

3. The jig of claim 1, wherein the retaining members include one end, which extends from the main body, and the other
   end, which is bent from the one end and extends toward the main body, so that the retaining members are configured to be in close contact with the portable electronic device.

4. The jig of claim 3, further comprising a reinforcing member which is constructed to connect the one end of the retaining members and the main body.

5. The jig of claim 3, wherein the retaining members comprise:
   a support portion which extends from the main body and is formed in a plate;
   a deforming portion which is bent from the support portion and extends toward the portable electronic device and the main body; and
   a contact portion which is bent from the deforming portion and slantly extends toward the main body.

6. The jig of claim 1, wherein contact surfaces of the retaining members are configured to be in close contact with outer side surface of the portable electronic device, wherein each of the contact surfaces of the retaining members is arranged along a first path extending along the outer side surface of the portable electronic device, which is disclosed before its release or sales, or a second path shorter than the first path.

7. A guide jig device for installing a protection member on a portable electronic device, the guide jig device comprising:
- a jig which includes a main body having a through hole and a plurality of retaining members, wherein the retaining members are elastically deformable, wherein the plurality of retaining members are coupled or connected to the main body, and wherein the plurality of retaining members surround a mounting space formed on a bottom of the main body such that the portable electronic device is inserted into the mounting space; and
- the protection member disposed on an inner surface of the plurality of retaining members and on a bottom of the jig,
- wherein a part of a removable member is removably attached to the protection member through the through hole.

8. The guide jig device of claim 7, wherein the retaining members include one end, which extends from the main body, and the other end, which is bent from the one end and extends toward the main body, so that the retaining members are configured to be in close contact with the portable electronic device.

9. The guide jig device of claim 7, further comprising a the removable member which is attached to a top of the jig.

10. The guide jig device of claim 7, wherein the portable electronic device is a smartphone, mobile phone, or tablet computing device.

11. The guide jig device of claim 1, wherein the portable electronic device is a smartphone, mobile phone, or tablet computing device.

\* \* \* \* \*